US012254862B2

(12) United States Patent
Baudet

(10) Patent No.: US 12,254,862 B2
(45) Date of Patent: Mar. 18, 2025

(54) ASSEMBLY AND METHOD FOR ACTIVE CONTROL OF THE ROLLING NOISE FOR A MOTOR VEHICLE

(71) Applicant: RENAULT S.A.S, Boulogne Billancourt (FR)

(72) Inventor: Guillaume Baudet, Orsay (FR)

(73) Assignee: AMPERE S.A.S., Boulogne Billancourt (FR)

( * ) Notice: Subject to any disclaimer, the term of this patent is extended or adjusted under 35 U.S.C. 154(b) by 182 days.

(21) Appl. No.: 18/248,495

(22) PCT Filed: Sep. 23, 2021

(86) PCT No.: PCT/EP2021/076224

§ 371 (c)(1),
(2) Date: Apr. 10, 2023

(87) PCT Pub. No.: WO2022/078728

PCT Pub. Date: Apr. 21, 2022

(65) Prior Publication Data

US 2023/0368770 A1 Nov. 16, 2023

(30) Foreign Application Priority Data

Oct. 12, 2020 (FR) ...................................... 2010381

(51) Int. Cl.
*G10K 11/178* (2006.01)

(52) U.S. Cl.
CPC .. *G10K 11/17883* (2018.01); *G10K 11/17823* (2018.01); *G10K 11/17825* (2018.01);
(Continued)

(58) Field of Classification Search
CPC ... G10K 11/17883; G10K 2210/12821; G10K 2210/1282; G10K 11/17879; G10K 11/17823; G10K 11/178; G10K 2210/3211
See application file for complete search history.

(56) References Cited

U.S. PATENT DOCUMENTS

| | | | | |
|---|---|---|---|---|
| 10,065,561 | B1 * | 9/2018 | Bastyr | G10K 15/02 |
| 10,235,987 | B1 | 3/2019 | Valeri et al. | |

(Continued)

FOREIGN PATENT DOCUMENTS

| | | | |
|---|---|---|---|
| DE | 10 2004 008 614 | A1 | 9/2005 |
| EP | 2 657 086 | A1 | 10/2013 |

OTHER PUBLICATIONS

International Search Report issued Dec. 23, 2021 in PCT/EP2021/076224 filed on Sep. 23, 2021, 2 pages.

(Continued)

*Primary Examiner* — Kile O Blair
(74) *Attorney, Agent, or Firm* — Oblon, McClelland, Maier & Neustadt, L.L.P.

(57) ABSTRACT

An assembly actively controls the rolling noise for a motor vehicle. The assembly includes a path control device that includes another sensor fastened on the steering knuckle, such as an accelerometer. The path control device is capable of transmitting, to the anti-noise device, measurements obtained by the other sensor. The anti-noise device is capable of generating an anti-noise signal depending on the acceleration measurements obtained and controlling its transmission via the loudspeaker.

12 Claims, 2 Drawing Sheets

(52) U.S. Cl.
CPC .............. *G10K 2210/12821* (2013.01); *G10K 2210/3011* (2013.01); *G10K 2210/3026* (2013.01); *G10K 2210/3027* (2013.01); *G10K 2210/3044* (2013.01)

(56) References Cited

U.S. PATENT DOCUMENTS

| | | | |
|---|---|---|---|
| 2013/0259249 | A1 | 10/2013 | Sakamoto et al. |
| 2013/0311040 | A1 | 11/2013 | Hasegawa et al. |

OTHER PUBLICATIONS

French Preliminary Search Report issued Jun. 4, 2021 in French Application 2010381 filed on Oct. 12, 2020, 3 pages (with Translation of Category of Cited Documents).

* cited by examiner

ASSEMBLY AND METHOD FOR ACTIVE CONTROL OF THE ROLLING NOISE FOR A MOTOR VEHICLE

The invention relates to an active rolling noise control assembly and method for a motor vehicle. In the automotive field, it is well known to implement active noise control methods, producing anti-noise signals that make it possible to reduce noise pollution in the passenger compartment of the vehicle.

In particular, structure-borne noise generated by the rolling of the motor vehicle on the roadway causes vibrations of the structure and therefore audible noise in the passenger compartment, which may be particularly annoying for users.

To generate an active noise control signal to compensate for the noise pollution of a motor vehicle, it is known that an anti-noise signal may be generated by a regulation command on the basis of a reference signal and of an error signal, such as a Feedback regulation, or a Feedforward regulation, as it is generally known.

Document EP2239728A2 is known in particular, and discloses a system for active noise control based on the output of the audio system, in which the system generates an anti-noise signal that is emitted by the passenger compartment audio system on the basis of a sensor installed on the vehicle, such as an accelerometer.

However, one problem with such a solution is that it is necessary to install a sensor able to supply the reference signal, this being relatively expensive and relatively complex to implement on an existing motor vehicle architecture.

Indeed, adding sensors to a motor vehicle requires in particular an available installation volume, an available fixing point and additional wiring. However, obtaining available fixing points in a motor vehicle architecture is a relatively great challenge.

There is therefore a need for an active noise control assembly that makes it possible to solve the problems outlined above.

To this end, what is proposed is an active rolling noise control assembly for a motor vehicle, comprising a trajectory control device comprising at least one wheel speed sensor fixed to a steering knuckle of a wheel of the motor vehicle, and an anti-noise device able to command at least one loudspeaker installed in the passenger compartment of the motor vehicle.

The trajectory control device comprises another sensor fixed to said steering knuckle, said trajectory control device being designed to transmit, to said anti-noise device, measurements obtained by said other sensor;

Said anti-noise device being designed to generate an anti-noise signal on the basis of said measurements from said other sensor and command the emission thereof via said loudspeaker. It is thus possible to obtain a high-performance active noise control system that is able to be adapted to existing vehicle architectures without creating bulk and additional excess weight. A sensor installed on the steering knuckle also provides a very good measurement of the source of rolling noise, with very high coherence, namely the tire/roadway contact, since it is very close to this contact.

In other words, the sensors mounted on the steering knuckle provide a signal of very good quality for controlling rolling noise according to the coherence criterion, which thus allows a significant gain in terms of noise reduction performance.

Advantageously and without limitation, the trajectory control device comprises, for each wheel of the motor vehicle, a speed sensor mounted on said steering knuckle associated with said wheel, characterized in that it furthermore comprises, for each wheel, another sensor mounted on said associated steering knuckle; said trajectory control device being designed to transmit, to said anti-noise device, said measurements obtained by each of said other sensors, said anti-noise device being designed to command the loudspeakers to emit an anti-noise signal based on the measurements obtained from each of said other sensors.

It is thus possible to take into account the noise created in the passenger compartment by the rolling of each wheel on the passenger compartment, thereby improving active noise reduction. Advantageously and without limitation, said at least one other sensor comprises an accelerometer, for example a three-axis accelerometer, or an angular velocity sensor, such as a gyrometer, or a laser sensor. This makes it possible to take into account the vibration dynamics of the wheel on the roadway in a relatively complete manner, thereby making it possible to obtain relatively robust reference signals.

Advantageously and without limitation, said other sensors are designed to sample said measurements obtained from said associated steering knuckles at a frequency greater than or equal to 2000 Hz. It is thus possible to avoid implementing an anti-aliasing filter before digitizing the signal. Such an anti-aliasing filter has a cost in terms of signal latency and delay. This unfiltered sampling thus ensures better performance of the system. Indeed, this gives a sampling frequency sufficient to guarantee robust taking into account of the vibration dynamics of the rolling while still having negligible aliasing of the spectrum for noise control up to 300 Hz.

Advantageously and without limitation, said trajectory control device communicates with said anti-noise device via a low-latency communication bus, for example with a maximum latency of one or two samples. It is thus possible to achieve fast transmission of the reference signals in order to allow effective active noise reduction.

Advantageously and without limitation, said communication bus is designed to transmit said measurements obtained by said other sensors at a frequency at least equal to said sampling frequency of said other sensors. This makes it possible to ensure that no resampling of the data is performed to transmit the data from the trajectory control device to the anti-noise device.

Advantageously and without limitation, the assembly comprises, in the passenger compartment of the motor vehicle, at least one microphone able to pick up the noise to be reduced that is present in the passenger compartment; said anti-noise device being designed to command the loudspeakers to emit an anti-noise signal on the basis also of said ambient noise picked up by said at least one microphone. This microphone thus makes it possible to implement feedback loop control, generally called Feedback, in which the error signal is obtained by the microphone. The invention also relates to an active rolling noise control method for a motor vehicle, implemented by an anti-noise device of an assembly as described above, comprising steps of:

Receiving at least one set of sampled values of measurements acquired by said other sensors of the trajectory control device;

Generating an anti-noise signal on the basis of said received sampled values; and Emitting said anti-noise signal via said loudspeakers of said anti-noise device.

Advantageously and without limitation, an anti-noise signal is generated by a feedforward command, also called feedforward command, called Feedforward, in which the reference signal corresponds to all of the sampled measurements from said other sensors, and at least one error signal is supplied by sampling at least one sound obtained by at least one microphone in the passenger compartment of the motor vehicle. This thus makes it possible to obtain a relatively efficient and robust anti-noise signal.

The invention also relates to a motor vehicle comprising an assembly as described above, in which the anti-noise device implements the method as described above.

Other features and advantages of the invention will become apparent from reading the description provided below of one particular embodiment of the invention, given by way of indication but without limitation, with reference to the appended drawings, in which.

Figure 1:
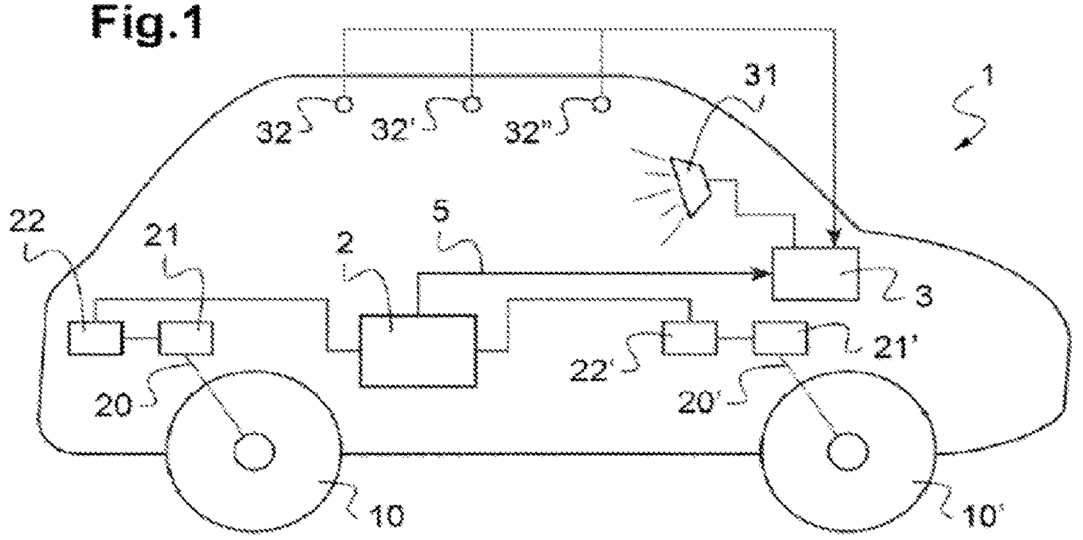
FIG. 1 is a schematic view of a motor vehicle comprising an assembly according to the invention.
Figure 2:
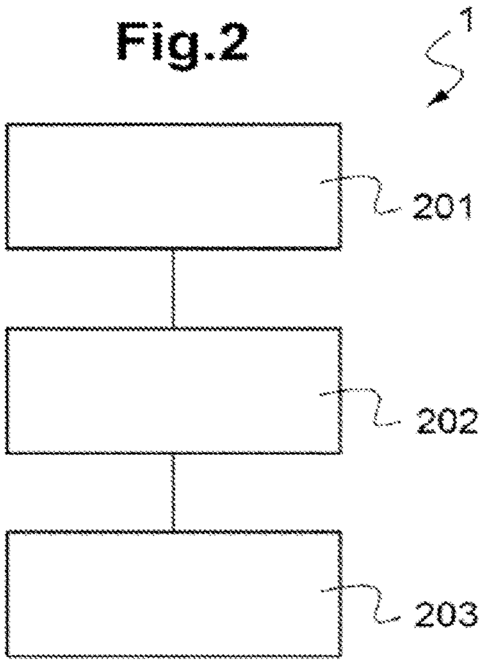
FIG. 2 is a flowchart of a method implemented by the anti-noise device of the assembly of FIG. 1.
Figure 3:
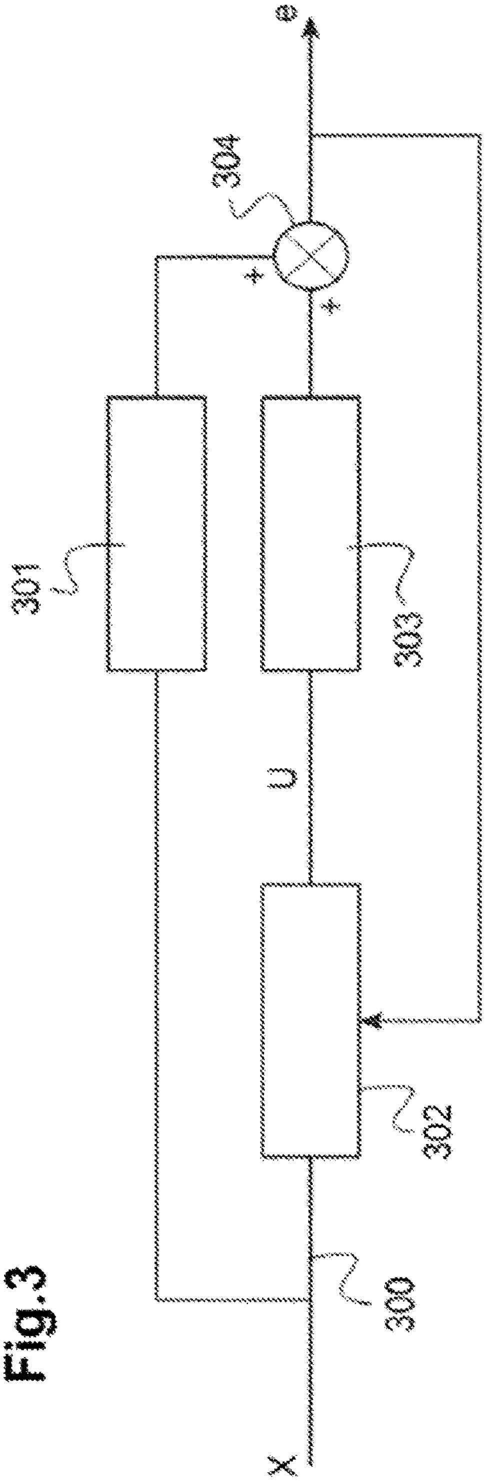
FIG. 3 is a diagram of Feedforward control, as implemented by the anti-noise device according to the invention.

Since FIGS. 1 and 3 relate to one and the same embodiment of the invention, they will be commented on at the same time.

A motor vehicle, as shown in FIG. 1, comprises an active noise control assembly 1 for actively controlling noise in the passenger compartment of the motor vehicle.

The invention relates in particular to the active control of the noise caused by the vibrations of the wheels when running on the roadway, which vibration is transmitted to the entire structure of the vehicle and creates noise in the passenger compartment through fluid/structure coupling. To control and reduce this noise, the assembly 1 comprises firstly the trajectory control device 2 of the motor vehicle, and also an anti-noise device 3.

The trajectory control device 2, also known as ESP, for Electronic Stability Program, allows the vehicle in particular to stay on a correct trajectory in the event of loss of grip.

The trajectory control device 2 comprises in particular, for each wheel 10, 10' of the motor vehicle, a wheel speed sensor 21, 21', which is generally mounted on the steering knuckle 20, 20' of the corresponding wheel 10, 10'.

Indeed, installing speed sensors 21, 21' on the steering knuckles 20, 20' of the drive axle, generally at the front, exhibits good coherence with certain structure-borne noise originating from the powertrain.

Indeed, the transmissions connect the powertrain and the steering knuckles 20, 20'; they transmit the engine torque, which is their main function, but also the vibrations of the powertrain. The invention is therefore also effective in attenuating certain noises of the powertrain.

In a motor vehicle from the prior art, the trajectory control device 2 is independent and not connected to the anti-noise device 3, the function of which is remote.

The anti-noise device 3 here is an active noise reduction device, also known as ANC for Active Noise Control.

Numerous types of active anti-noise device 3 are known from the prior art.

The invention does not aim to describe the precise operation of one specific type of active noise control, the principle of which, based on the interference between two waves, is well known to those skilled in the art.

Various types of noise control are known for such anti-noise devices. Open-loop regulation is known in particular, carried out without an error sensor, but with a reference signal from the source. Feedback control is also known, in which regulation is carried out with a correction on the basis of an error signal, and Feedforward control is also known, in which the correction is made on the basis of the error signal and of the reference signal.

In the context of anti-noise control aimed at reducing the structure-borne rolling noise of a motor vehicle, only Feedforward control makes it possible to achieve a satisfactory result.

Rolling noise is random and therefore makes it unpredictable, unlike engine noise, the harmonics of which have a slower phase and amplitude evolution.

Engine noise also has a relatively narrow spectrum, while rolling noise has a broad spectrum.

Therefore, only Feedforward control makes it possible to achieve a satisfactory result in the context of active structure-borne rolling noise reduction.

However, Feedforward control requires not only coherence of the reference signal x and error signal e, which, in the case of a random signal, is relatively complex, but also a measurement time constraint for these signals.

In a Feedforward control system, it is necessary to obtain a reference signal x that corresponds to the source of the generated noise, and an error signal e that corresponds to the noise remaining after processing.

To this end, the assembly 1 comprises at least one microphone 32-32", for example 3 microphones, to detect the error signal e.

These microphones 32-32" are installed in the passenger compartment, and although they are shown in the upper part in FIG. 1, they may be installed at other locations in the passenger compartment, in particular in the lower part, so as to pick up noise that persists after noise reduction.

The reference signal x is the measurement of the vibrations on the structure of the vehicle that propagate from the wheels.

The trajectory control device 2 comprises, for each wheel, in addition to the speed sensors 21, 21', sensors 22, 22', in this particular embodiment accelerometers 22, 22', in particular three-axis accelerometers, mounted integrally with the steering knuckles 20, 20' of each wheel 10, 10'.

In particular, these sensors 22, 22' are integrated into the speed sensors 21, 21', thereby making it possible not to have to fix them independently, solving the problem of sensor fixing points on the structure of the motor vehicle.

The invention is however not limited to accelerometers as sensors, but relates to any type of sensor integrated into the trajectory control device and fixed to the steering knuckle 20, 20'.

In particular, laser sensors that measure the roughness of the road or the relative displacement between the two faces of the wheel bearing also give particularly relevant reference signals, and may be integrated into the wheel speed sensor 21, 21'.

The position and the shape of the speed sensor 21, 21' make it particularly suitable for carrying such a laser sensor that measures the displacement of the face of the bearing on the rotating side, since it is on this face where the magnetic targets used to measure the wheel speed are installed.

According to one particular implementation of the invention, it is also possible to install, in the trajectory control device, a gyrometer for each wheel, this gyrometer being able in particular to be integrated into the speed sensor 21, 21', for example in addition to the accelerometer and/or the radar.

Each gyrometer supplies additional reference signals able to improve active noise reduction. However, the addition of these additional data requires the communication bus 5 to be designed to transmit these data quickly enough.

To this end, the trajectory control device 2 comprises, for each wheel, in addition to the speed sensors 21, 21', accelerometers 22, 22', in particular three-axis accelerometers, mounted integrally with the steering knuckles 20, 20' of each wheel 10, 10'.

Such an installation of the accelerometers makes it possible to reliably measure the vibrations of the wheels on the roadway, while still picking up this wave as early as possible before it propagates into the passenger compartment.

Indeed, in a Feedforward ANC system, the anti-noise signal is generated by the convolution of the noise measured by the microphone 32, 32" and the reference signal obtained by the accelerometers 22, 22'.

The anti-noise device 3 generating this anti-noise signal and emitting it from a loudspeaker 31 installed in the passenger compartment of the vehicle has the effect of causing an attenuation, which has a tendency to cancel out undesirable noise.

To this end, the anti-noise signal should reach the error signal microphone 32, 32" earlier than the unwanted noise propagating from the wheels to the passenger compartment.

Therefore, with reference to FIG. 3, the total delay of the reference path 300 comprising the noise controller 302 and the secondary path 303 should be less than that of the primary path 301, which corresponds to the propagation of the sound from the wheels to the passenger compartment, the summation 304 corresponding to the error picked up by the error microphone 32-32". This is a causality constraint, and if this condition is not satisfied, the Feedforward ANC system is not able to reduce unwanted noise correctly.

In order to ensure this causality constraint, the accelerations measured by the accelerometers 22, 22' are sampled at a relatively high frequency, preferably greater than 2000 Hz. Such raw sampling, in other words unfiltered sampling, at high frequency thus avoids the use of an anti-aliasing low-pass filter that penalizes latency, since a filter always introduces a phase shift and therefore a delay. Indeed, at such frequencies, the aliasing error of the spectrum is negligible for noise control up to 300 Hz.

With the acceleration signals being picked up first by the trajectory control device 2, using the conventional transmission buses of this device 2, these signals are then sent to the anti-noise device 3.

To ensure fast transmission, a low-latency communication bus 5 is installed between the trajectory control device 2 and the anti-noise device 3.

Low latency is understood to mean, for a digital bus as implemented in the invention, one or at most two latency samples with a frequency greater than or equal to 2000 Hz.

This communication bus 5 is in particular designed to transmit the data at a frequency at least equal to the sampling frequency of the accelerometers.

This communication is also optimized by the communication bus 5 by transmitting the unfiltered raw data.

Each accelerometer 22, 22', being associated with three axes in this embodiment, and the vehicle in this embodiment comprising four wheels 10, 10', there is a total of 12 sampled signals to be transmitted between the trajectory control device 2 and the anti-noise device 3.

The anti-noise device 3 then implements a method comprising firstly receiving 201 the sampled signals, generating an anti-noise signal 202, and then emitting 203 the anti-noise signal by way of the loudspeaker 31 in the passenger compartment.

The anti-noise signal is generated 202 by Feedforward control, based on the one or more signals from the one or more error microphones 32-32" and the received samples of the reference signal x.

The invention claimed is:

1. An active rolling noise control assembly for a motor vehicle, comprising:
- a trajectory control device comprising at least one wheel speed sensor fixed to a steering knuckle of a wheel of the motor vehicle, and
- an anti-noise device configured to command at least one loudspeaker installed in a passenger compartment of the motor vehicle,
- wherein the trajectory control device comprises another sensor fixed to said steering knuckle, said trajectory control device being configured to transmit, to said anti-noise device, measurements obtained by said other sensor, and
- wherein said anti-noise device is configured to generate an anti-noise signal based on said measurements obtained from said other sensor and command an emission thereof via said loudspeaker.

2. The assembly as claimed in claim 1, wherein:
- the trajectory control device comprises, for each wheel of the motor vehicle, a speed sensor mounted on said steering knuckle associated with said wheel,
- the trajectory control device comprises, for each wheel, another sensor mounted on said associated steering knuckle,
- said trajectory control device is configured to transmit, to said anti-noise device, said measurements obtained by each of said other sensors, and
- said anti-noise device is configured to command the loudspeaker to emit an anti-noise signal based on said measurements obtained from each of said sensors.

3. The assembly as claimed in claim 1, wherein said at least one other sensor comprises an accelerometer or an angular velocity sensor.

4. The assembly as claimed in claim 3, wherein said accelerometer is a three-axis accelerometer or said angular velocity sensor is a gyrometer or a laser sensor.

5. The assembly as claimed in claim 1, wherein said other sensors are configured to sample said measurements obtained from said associated steering knuckles at a frequency greater than or equal to 2000 Hz.

6. The assembly as claimed in claim 1, wherein said trajectory control device communicates with said anti-noise device via a low-latency communication bus.

7. The assembly as claimed in claim 6, wherein said low-latency communication bus has a maximum latency of one or two samples.

8. The assembly as claimed in claim 6, wherein said communication bus is configured to transmit said measurements obtained by said other sensors at a frequency at least equal to said sampling frequency of said other sensors.

9. The assembly as claimed in claim 1, further comprising, in the passenger compartment of the motor vehicle, at least one microphone that is configured to pick up the noise to be reduced that is present in the passenger compartment,
- wherein said anti-noise device is configured to command the loudspeakers to emit an anti-noise signal based on said ambient noise picked up by said at least one microphone.

10. An active rolling noise control method for a motor vehicle, implemented by the anti-noise device of the assembly as claimed in claim 9, said method comprising:

receiving at least one set of sampled values of measurements acquired by said other sensors of the trajectory control device;

generating an anti-noise signal based on said received sampled values; and emitting said anti-noise signal via said loudspeakers of said anti-noise device.

11. The method as claimed in claim 10, wherein said anti-noise signal is generated by a feedforward command, in which the reference signal corresponds to all of the sampled measurements from said other sensors, and an error signal is supplied by sampling a sound obtained by a microphone in the passenger compartment of the motor vehicle.

12. A motor vehicle comprising:

the assembly as claimed in claim 1.

* * * * *